United States Patent [19]

Suzuki et al.

[11] Patent Number: 4,738,330
[45] Date of Patent: Apr. 19, 1988

[54] HYDRAULIC DRIVE SYSTEM FOR USE WITH VEHICLE POWER STEERING PUMP

[75] Inventors: Masahiko Suzuki, Aichi; Hiroshi Iwata, Kariya; Kazuma Matsui, Toyohashi; Akira Takagi, Kariya; Yasuhiro Horiuchi, Aichi; Kougorou Nakagawa; Toshiki Sugiyama, both of Kariya, all of Japan

[73] Assignee: Nippondenso Co., Ltd., Kariya, Japan

[21] Appl. No.: 841,751

[22] Filed: Mar. 20, 1986

[30] Foreign Application Priority Data

| Mar. 22, 1985 | [JP] | Japan | 60-58866 |
| Apr. 26, 1985 | [JP] | Japan | 60-91965 |
| Jul. 9, 1985 | [JP] | Japan | 60-150909 |
| Oct. 3, 1985 | [JP] | Japan | 60-220725 |

[51] Int. Cl.$^4$ .............................................. B62D 5/087
[52] U.S. Cl. ......................... 180/141; 60/443; 60/450; 123/41.12; 137/101; 137/117; 180/143; 280/6 R
[58] Field of Search ............... 180/141, 143; 60/443, 60/450, 452; 123/41.12, 41.49; 137/101, 117; 74/388 PS; 165/39; 62/133; 280/6 R

[56] References Cited

U.S. PATENT DOCUMENTS

| 3,241,318 | 3/1966 | Rohde | 137/101 |
| 3,659,567 | 5/1972 | Murray | 123/41.12 |
| 4,179,888 | 12/1979 | Goscenski, Jr. | 60/420 |
| 4,361,166 | 11/1982 | Honaga et al. | 137/117 |
| 4,446,697 | 5/1984 | Goscenski, Jr. | 60/443 |
| 4,566,477 | 1/1986 | Barker et al. | 137/101 |
| 4,601,358 | 7/1986 | Kozuka et al. | 180/141 |
| 4,658,584 | 4/1987 | Suzuki et al. | 60/450 |
| 4,663,936 | 5/1987 | Morgan | 137/117 X |

FOREIGN PATENT DOCUMENTS

| 142713 | 5/1985 | European Pat. Off. | 123/41.12 |
| 53-140827 | 7/1978 | Japan. | |

Primary Examiner—Richard A. Bertsch
Assistant Examiner—Mitchell J. Hill
Attorney, Agent, or Firm—Cushman, Darby & Cushman

[57] ABSTRACT

A hydraulic drive system for use with a vehicle power steering pump has a hydraulic motor connected in series with a power steering mechanism and a bypass line extending in bypassing relationship with the motor. A bypass valve is disposed in the bypass line to control the flow through the bypass line such that, when a steering force applied to a vehicle steering wheel is increased, the bypass flow is substantially in proportion to the steering force.

13 Claims, 14 Drawing Sheets

FIG. I

HYDRAULIC DRIVE SYSTEM FOR USE WITH VEHICLE POWER STEERING PUMP

BACKGROUND OF THE INVENTION

The present invention relates to a hydraulic vehicle accessory drive power steering system.

It has been known from, for example, U.S. Pat. Nos. 3,659,567, 4,179,888 and 4,446,697 that a single hydraulic motor is used to hydraulically drive an automotive power steering mechanism and a hydraulic fan motor. In the prior art hydraulic drive system disclosed, for example, in U.S. Pat. No. 3,659,567, the hydraulic fan motor and the power steering mechanism are connected in series to the single hydraulic pump. The system includes a bypass line extending in bypassing relationship to the fan motor. A bypass valve is disposed in the bypass line and, when the power steering mechanism is operated, is responsive to a pressure difference across the power steering mechanism to cause the hydraulic fluid to flow to the power steering mechanism in preference to the fan motor.

In the prior art hydraulic drive system, however, the bypass valve is opened and closed merely in response to operations of the power steering mechanism. Therefore, when the bypass valve is opened in response to an operation of the power steering mechanism, it is possible that the hydraulic fluid is fed to the power steering mechanism under different pressures with a result that the mechanism produces discontinuous steering power or torque which gives the operator a physical feeling of disorder and discontinuity of the steering power. On the other hand, if the operator frees the steering wheel to abruptly remove his steering force therefrom, the bypass valve is suddenly closed with a resultant abrupt increase in the supply of the hydraulic fluid to the fan motor. Thus, the fan motor is suddenly driven again to produce noise.

SUMMARY OF THE INVENTION

The present invention aims at providing a hydraulic drive system improved to eliminate the problems discussed above. More specifically, it is an object of the present invention to provide a hydraulic drive system in which the feeling of physical disorder and discontinuity of the steering power experienced in the prior art hydraulic drive system is reduced. It is another object of the present invention to provide a hydraulic drive system which is improved to reduce the noise produced in the prior art drive system by the hydraulic motor and cooling fan due to sudden increase in the flow of the hydraulic fluid to the motor when a steering force is suddenly decreased. It is a further object of the present invention to provide a hydraulic fan motor drive and power steering system in which at least one bypass valve is provided to control flows of the hydraulic fluid to the fan motor and the power steering mechanism in accordance with cooling demands and steering actions or motions.

The hydraulic drive system for a vehicle according to the present invention includes a hydraulic pump adapted to be driven by an engine of the vehicle to pump hydraulic fluid through a main hydraulic fluid supply line. A power steering mechanism is disposed in the main hydraulic fluid supply line and is operable by the hydraulic fluid from the hydraulic pump in response to a steering operation of a steering system of the vehicle. A hydraulic actuator is disposed in the main hydraulic fluid supply line in series with the power steering mechanism and is adapted to be hydraulically driven by the hydraulic fluid from the pump to drive an accessory of the vehicle. A bypass line extends in bypassing relationship with the hydraulic actuator to interconnect points of the main hydraulic fluid supply line upstream and downstream of the hydraulic actuator. A bypass valve is disposed in the bypass line to control the flow of the hydraulic fluid through the bypass line.

In an embodiment of the invention, the bypass valve is arranged such that the fluid flow through the bypass line is controlled to be increased substantially in proportion to the increase in a steering force applied to the steering system. In another embodiment of the invention, the bypass valve is operative such that, when the steering force applied to the steering system is decreased, the fluid flow through the bypass line is controlled to be gradually decreased.

The above and other objects, features and advantages of the present invention will be made more apparent by the following description with reference to the accompanying drawings.

DESCRIPTION OF PREFERRED EMBODIMENTS

Figure 1:
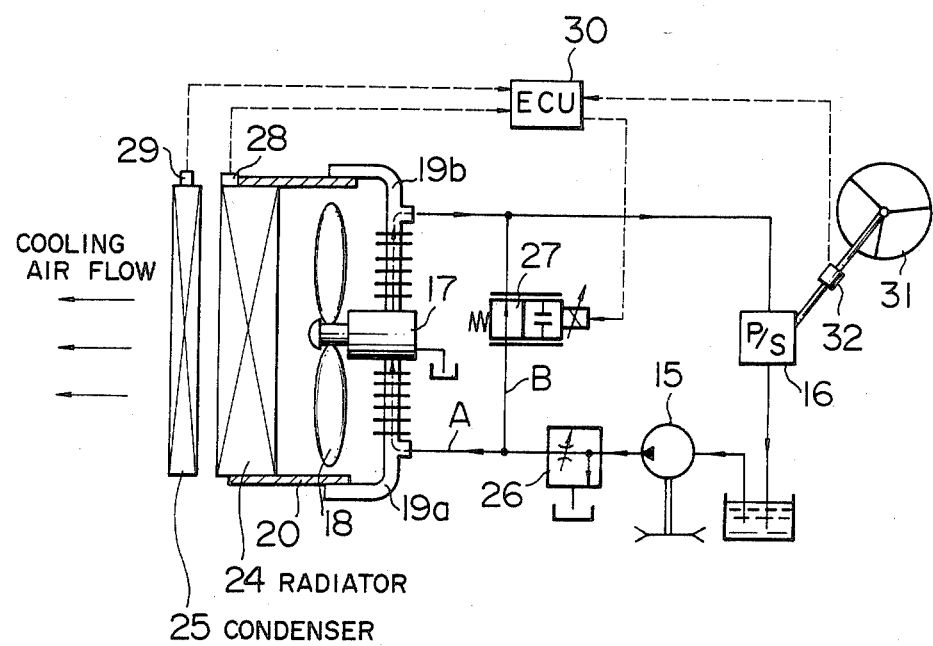
FIG. 1 is a diagrammatic illustration of a first embodiment of the present invention.

Referring to FIG. 1, a hydraulic system used to drive a power steering mechanism (hereinafter called as "P/S mechanism") 16 includes a conventional engine-driven hydraulic pump 15 which may be of any one of vane type, gear type, piston type and so on. A conventional hydraulic motor 17, which may be of any one of gear type, vane type, piston type and so on, is disposed in a hydraulic line A and connected in series to the pump 15 and a power cylinder (not shown) of the P/S mechanism 16. The hydraulic motor 17 has an output drive shaft to which a cooling fan 18 is connected for rotation therewith to produce a flow of cooling air as indicated by parallel arrows in FIG. 1. A heat exchanger in the form of a radiator 24 for cooling engine cooling water and a second heat exchanger in the form of a condenser 25 for cooling airconditioning refrigerant are disposed downstream of the cooling fan 18 as viewed in the direction of the flow of the cooling air.

A flow regulating valve 26 having a relief valve therein is series-connected to the discharge port of the hydraulic pump 15 and the motor 17 to supply hydraulic fluid flow to the motor 17 or the P/S mechanism 16 at a constant rate irrespective of the speed of the engine and thus of the pump 15.

A bypass line B is provided between points of the hydraulic line A upstream and downstream of the motor 17. A solenoid-actuated valve 27 is provided in the bypass line B to continuously control the flow rate through the bypass line B according to radiation loads or cooling demands of the radiator 24 and the condenser 25 as judged by an electric control unit (hereinafter called as "ECU") 30. More specifically, the ECU 30 is electrically connected to a water temperature sensor 28 of engine/cooling water in the radiator 24 and to a pressure sensor 29 operative to detect the pressure of refrigerant in the condenser 25 so that the ECU 30 is operative to judge the radiation loads on the radiator 24 and the condenser 25 on the basis of electrical signals from the sensors 28 and 29.

A steering wheel 31 is operatively associated with the P/S mechanism 16 in conventional manner and also operatively associated with a steering sensor unit 32 including various sensors such as a steering angle sensor (not shown), a steering angular velocity sensor (not shown) and a steering torque sensor (not shown). On the basis of signals from the steering sensor unit 32, the ECU 30 is operative to judge the presence or absence of steering action and the magnitude of the steering torque. The result of the judgement is emitted in the form of an electrical signal by which the solenoid-actuated valve 27 is controlled. Namely, when there is a steering action, the ECU 30 emits to the valve 27 a valve-open signal in preference to and irrespective of the extent of the radiation loads of the radiator 24 and the condenser 25. When there is no steering action, the ECU 30 controls the solenoid-actuated valve 27 solely on the basis of the level of the radiation demands of the radiator 24 and the condenser 25 such that, when the radiation loads are at high levels, the valve 27 is actuated toward its closed position and, when the radiation loads are at low levels, the valve 27 is actuated towards its open position whereby the rate of the hydraulic fluid flow through the bypass line B is controlled to vary the speed of the hydraulic motor 17. The solenoid-actuated valve 27 is controlled according to duty ratio, namely, the ratio of time period while the solenoid of the valve 27 is electrically energized relative to a time period while the solenoid is electrically deenergized. The control will be discussed in more detail hereunder.

The ECU 30 is responsive to signals from the steering sensor unit 32 to determine the force of a steering action and emits to the solenoid-actuated valve 27 an electrical signal of a duty ratio corresponding to the steering force thus determined. More specifically, when the steering force is of a high level, the ECU 30 emits a duty signal of a short, duty or "ON"-time period, as will be seen in FIG. 2. On the other hand, when the steering force is of a high level, the ECU 30 emits a duty signal of a long ON-time period. Thus, upon commencement of a steering action, an electrical duty signal corresponding to the force of the steering action is fed to the solenoid-actuated valve 27 to control the valve operation so that the valve allows the hydraulic fluid to flow through the bypass line B at a rate corresponding to the force of the steering action whereby the P/S mechanism 16 is supplied with a suitable hydraulic pressure to continuously produce a steering power. Thus, the steering power sensed by an operator through the steering wheel 31 is continuously varied. The operator does not feel any discontinuity in the steering power and thus is able to easily operate the steering wheel 31 without feeling an malaise or uneasiness.

Figure 2:
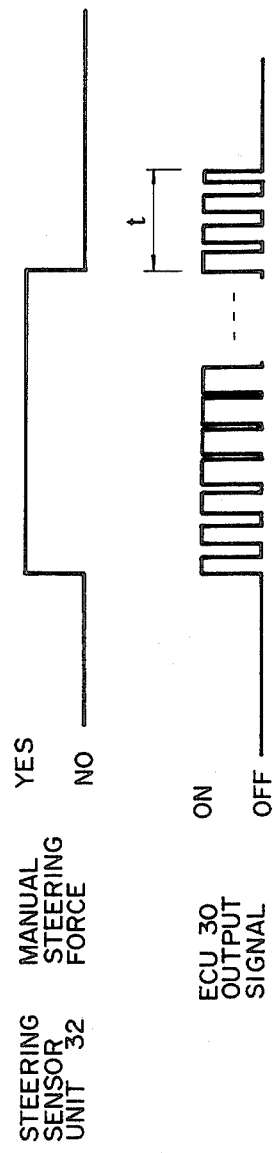
FIG. 2 diagrammatically illustrates an electrical signal emitted by a steering sensor unit shown in FIG. 1 and electrical signals emitted by an electrical control unit.

On the other hand, when the operator's force is removed from the steering wheel 31, the ECU 30 judges the absence of the steering force and interrupts the supply of electrical signal to the solenoid-actuated valve 27. However, if the operation of the valve 27 were suddenly stopped, the rate of fluid flow to and though the hydraulic motor 17 will be suddenly increased to suddenly re-start the fan motor 17 and the cooling fan 18 with a resultant production of noise. So as to avoid such a problem, therefore, the ECU 30 is arranged such that, when it receives from the steering sensor unit 32 signals representing a decrease in the operator's steering force on the steering wheel 31, the ECU 30 emits to the solenoid-actuated valve 27 a signal of a small duty ratio for a short time period t, as shown in FIG. 2, and thereafter interrupts the supply of electrical signals to the valve 27.

Figure 3:
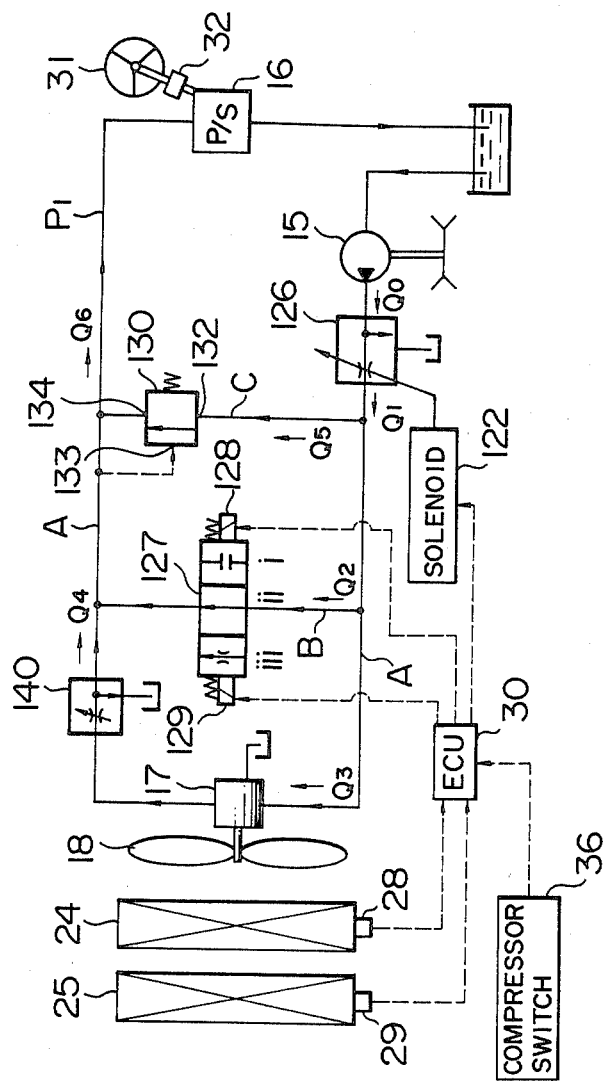
FIG. 3 is a diagrammatic illustration of a second embodiment of the invention.

A second embodiment of the invention is shown in FIG. 3 in which the parts the same as those of the first embodiment of the invention are designated by the same reference numerals. The following description will be directed mainly to the difference between the first and second embodiments.

A flow regulating valve 126 is arranged such that, when the engine speed NE is increased with a resultant increase in the discharge Q0 of the pump 15 beyond a predetermined flow rate Q1, a part of the fluid discharged by the pump 15 is drained to a tank to keep the output of the valve 126 at the flow rate Q1 so that the P/S mechanism 16 or the hydraulic motor 17 is fed with the fluid at this flow rate Q1. The valve 126 includes therein a variable orifice the opening of which is controlled in two steps by an electrically actuated solenoid 122 so that the flow rate Q1 is controlled to be a first lower level a and a second higher level b, as graphically shown in FIG. 4. The lower level a is chosen when the radiation loads on the radiator 24 and the condenser 25 are at low levels while the higher flow rate level b is chosen when the radiation loads on the radiator and the condenser are is of high levels.

A second bypass line C extends in parallel relationship to the first bypass line B and is disposed rearer to the pump 126 and the P/S mechanism 16 than the first bypass line B.

The first bypass line B is provided therein with a solenoid-actuated flow control valve 127 having solenoids 128 and 129 operative to control the flow rate Q2 through the valve 127 in three steps so that the flow rate Q3 of the fluid fed to and through the hydraulic motor 17 is also varied. More specifically, the flow control valve 127 has three positions i, ii and iii. In the valve positions i and iii, the motor 17 and thus the cooling fan 18 are rotated at a higher speed and at a lower speed, respectively, whereas the motor 17 and the fan 18 are stopped at the valve position ii.

Figure 6:
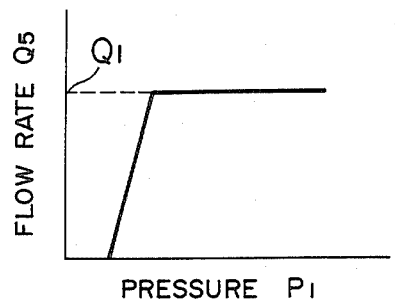
FIG. 6 graphically illustrates a flow rate Q5 determined by the valve shown in FIG. 5 relative to a pilot pressure P1 upstream of a power steering mechanism.

The second bypass line C is provided therein with a second flow control valve 130 responsive to a pressure P1 in the line A just upstream of the P/S mechanism 16 to control the rate of fluid flow through the valve 130. More specifically, the valve 130 is opened to increase the fluid flow Q5 through the second bypass line C when the pressure P1 exceeds, for example, 5 kg/cm$^2$. The flow control valve 130 is a spool valve of the structure shown in FIG. 5 and has a spool 131 a part of which is tapered as at 131a. The valve 130 is provided with three ports 132, 133 and 134 which are connected to the hydraulic circuit in the manner shown in FIG. 3. The tapered part 131a of the spool 131 is operative to vary the flow rate Q5 continuously and gradually so that the flow rate Q5 varies in a linear manner from zero (0) to the maximum rate Q1 (which is determined by the valve 126, as previously described), as shown in FIG. 6. Accordingly, when the P/S mechanism 16 is loaded and required to provide a steering power, the pilot pressure P1 is increased with a resultant increase in the flow rate Q5 though the second bypass line C whereby the P/S mechanism 16 is supplied with the hydraulic pressure in preference to the motor 17. Since the increase in the flow rate Q5 takes place continuously and gradually for the above discussed reason, the steering power produced by the P/S mechanism 6 is not varied suddenly Referring again to FIG. 5, the ports 133 and 34 of the spool valve 130 may advantageously be communicated through an orifice 136 therein so that self-excited vibration of the spool 131 can be suppressed to assure a stable steering operation.

Figure 5:
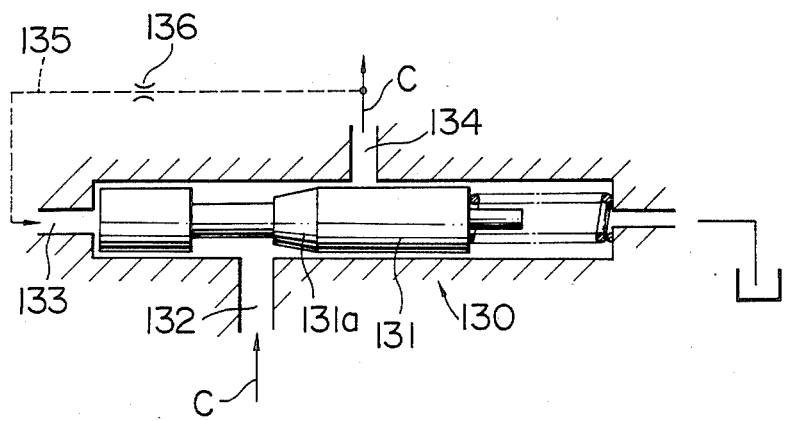
FIG. 5 is an enlarged partly sectional fragmentary view of a flow control valve disposed in a second bypass line shown in FIG. 3.
Figure 7:
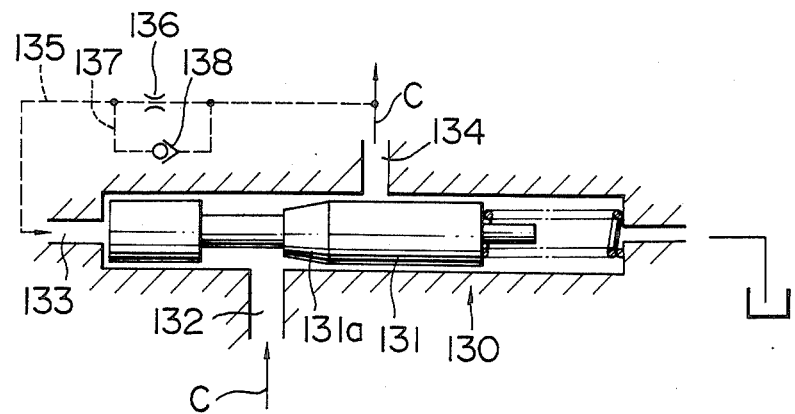
FIG. 7 is similar to FIG. 5 but illustrates a modification to the valve shown in FIG. 5.

FIG. 7 shows a modification to the flow control valve 130 shown in FIG. 5. The modification comprises an orifice-bypass passage 137 provided with a check valve 138 and extending in bypassing relationship to the orifice 136. The check valve 138 is arranged such that the check valve is opened when the spool 131 is moved in the direction to increase the flow rate Q5 to facilitate this movement and such that the check valve 138 is closed when the spool 131 is moved in the direction to reduce the flow rate Q5. Accordingly, when a steering operation is finished, the check valve 138 is closed to assure that the flow control valve 130 is closed slowly to gradually reduce the flow rate Q5 through the second bypass line C. Accordingly, the hydraulic motor 17 is prevented from being subjected to any sudden increase in the hydraulic pressure supply, so that the speed of the cooling fan 18 is not suddenly increased.

A second flow regulating valve 140 is provided on the main hydraulic line A between the motor 17 and the P/S mechanism 16 and is disposed in parallel relationship to the first bypass line B to regulate the rate Q4 of the fluid flow from the motor 17 to the P/S mechanism 16 so that the rate of fluid flow to the P/S mechanism 16 does not exceed a predetermined level a. Namely, the valve 140 is operative to drain excessive fluid to a tank. In general, a flow regulating valve causes a pressure loss of 1 to 3 kg/cm$^2$. In the embodiment of the invention, therefore, the flow regulating valve 140 is disposed in the position in which the valve 140 is required to operate only when the hydraulic fluid flows through the motor 17 to the P/S mechanism 16. In other words, the valve 140 is positioned just downstream of the motor 17. However, the valve 140 may be positioned at any other points on the line A closer to the P/S mechanism In addition to the temperature sensor 28 and pressure sensor 29 provided in the first embodiment of the invention, the second embodiment is provided with a compressor switch 36 operative to judge as to whether an airconditioning refrigerant compressor (not shown) is in operation or not. The compressor switch 36 emits output signals to the ECU 30. On the basis of signals from the sensors 28 and 29 and the compressor switch 36, the ECU 30 judges cooling demands or radiation loads of the radiator 24 and condenser 25. The judgements are shown in Table 1 below.

TABLE 1

| Cooling Demand | Sensor and Switch Signals | | |
|---|---|---|---|
| | Water temp. Sensor 28 | Pressure Sensor 29 | Compressor Switch 36 |
| High | Higher than 100° C. | — | — |
| Medium | Higher than 90° C. or 1.4 Mpa | | — |
| Low | Higher than 80° C. | — | ON |
| Super-low | Lower than 80° C. | — | OFF |

When the water temperature sensor 28 deteots the water temperature as being higher than 80° C. but lower than 90° C. or when the compressor switch 36 is in "ON" state, the cooling demand is "low"; and When the water temperature 28 senses the water temperature as being lower than 80° C. and the compressor switch is in "OFF" state, the cooling demand is "super-low". It is to be noted that the temperature and pressure levels appearing in the above Table 1 may vary with different automobiles.

Then, the operation of the described embodiment of the invention will be described hereunder with reference to Table 2 below.

TABLE 2

| Mode | Steering Action | Flow Control Valve 130 | Cooling Demand | Rate of Flow through respective lines | | | | |
|---|---|---|---|---|---|---|---|---|
| | | | | Q1 | Q2 | Q3 | Q4 | Q5 |
| I | Yes | Open | — | a | 0 | 0 | 0 | a |
| II | No | Closed | High | b | 0 | b | a | a |
| III | No | Closed | Medium | a | 0 | a | a | a |
| IV | No | Closed | Low | a | c | a–c | a–c | a |
| V | No | Closed | Super-low | a | a | 0 | 0 | a |

Figure 4:
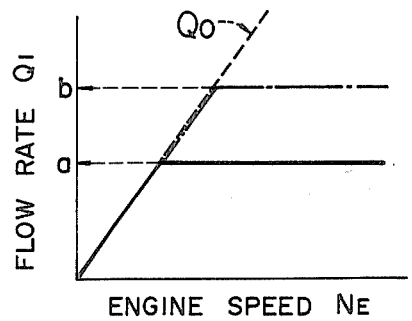
FIG. 4 graphically illustrates a flow rate Q1 in FIG. 1 relative to engine speed.

"Q1" denotes the flow rate just downstream of the flow regulating vlave 126 which is operated by the solenoid 122 which in turn is controlled by the ECU 30 such that the flow rate Q1 is normally a when the solenoid 122 is deenergized but the flow rate Q1 is increased to b (b is qreater than a) when the solenoid is energized. This operation characteristic is shown in FIG. 4. The flow rate a is determined to be the rate required for the steering operation of the P/S mechanism 16. "Q2" indicates the rate of flow through the first bypass line B and is varied in accordance with the positions i, ii and iii of the flow control valve 127 which is fully closed in the position i, fully opened in the position ii and partly opened in the position iii to allow the hydraulic fluid to flow therethrough at a rate c which is smaller than the rate a. "Q3" denotes the rate of flow to and though the hydraulic motor 17 and is controlled by the flow rate Q2 of the first bypass line B and the flow rate Q5 of the second bypass line C. "Q4" represents the flow rate just downstream of the motor 17 while Q6 indicates the flow rate at which the hydraulic fluid flows to the P/S mechanism 16.

Table 3 below shows energization (ON) and deenergization (OFF) of the solenoids 122, 128 and 129 in connection with the modes of operation shown in Table 2.

TABLE 3

| Modes | Cooling Demand | Solenoid 122 | Solenoid 128 | Solenoid 129 |
|---|---|---|---|---|
| II | High | ON | ON | OFF |
| III | Medium | OFF | ON | OFF |
| IV | Low | OFF | OFF | ON |
| V | Super-low | OFF | OFF | OFF |

In mode I of Table 2, i.e., when the steering action is present, the flow control valve 130 of the second bypass line C is opened irrespective of the level of the cooling demand to allow the hydraulic fluid to bypass the motor 17 and flow directly from the flow regulating valve 126 to the P/S mechanism 16. Thus, the rotation of the hydraulic motor 17 and thus of the cooling fan 18 is momentarily stopped and the power cylinder (not shown) of the P/S mechanism 16 is hydraulically actuated to produce a steering power.

In the modes II-V of Table 2, i.e., when there is no steering action, the ECU 30 controls the flow regulating valve 126 and the flow control valve 127 of the first bypass line B on the basis of the radiation loads on the radiator 24 and the condenser 25, namely, the cooling demands.

More specifically, in the mode II, i.e., when the cooling demand is high, the ECU 30 operates such that the flow regulating valve 126 is controlled to reduce the rate of drainage and increase the flow rate Q1 to the level b (higher than level a) and, at the same time, the flow control valve 127 in the second bypass line B is driven to its closed position. Thus, the hydraulic fluid flows to the motor 17 at the increased rate b so that the motor 17 and thus the cooling fan 18 are rotated at a high speed to cool the engine cooling water in the radiator 24 and the airconditioning refrigerant in the condenser 25. The fluid flowing out of the hydraulic motor 17 flows to the P/S mechanism 16 at the lower rate a which is determined by the flow regulating valve 140 disposed just downstream of the motor 17.

In the modes III, IV and V, namely, when the cooling demand is medium, low and super-low, respectively, the flow regulating valve 126 is controlled by the ECU 30 such that the flow rate Q1 is determined to be the lower rate a. In addition, the ECU 30 actuates the solenoids 128 and 129 of the flow control valve 127 in the first bypass line B such that the valve 127 is brought into one of the positions i, ii and iii in accordance with a cooling demand detected. According to the modes of operation, therefore, the flow rate Q2 of the first bypass line B is controlled to be zero (0), c or a and the flow rate Q3 for the motor 17 is controlled to be a, a-c or zero (0), whereby the speed of the hydraulic motor 17 and thus the cooling fan 18 is controlled to be medium, low or zero (0) in accordance with the controlled level of the flow rate Q3.

Figure 8:
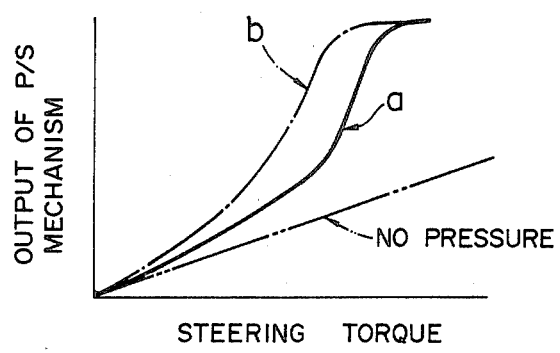
FIG. 8 graphically illustrates the output torque of the power steering mechanism relative to steering torque.

As described above, the flow rate Q3 is controlled to drive the cooling fan 18 at different speeds in accordance with the positions of the flow regulating valve 126 and the flow control valve 127. It will be appreciated that, in any of the modes II-V (i.e., when there is no steering action), the rate Q6 of flow to the P/S mechanism 16 is always kept at a level as high as the predetermined level a. Thus, when the P/S mechanism 16 is operated, it provides a constant and stable steering power because the flow rate Q6 is constant. If the flow rate Q6 is not constant but varied as shown by lines a and b in FIG. 8, the steering torque to be applied to steered wheels will be varied if it is intended to keep constant the output torque of the P/S mechanism 16. To the contrary, according to the described embodiment of the invention, because the flow rate Q6 is constant (at level a), the steering torque is kept constant to provide a stable steering feeling for the operator. In the described structure and arrangement, moreover, the hydraulic fluid always flows through the hydraulic line extending to the P/S mechanism 16. This is advantageous in that formation of bubbles in the hydraulic lines is suppressed to assure a quick response of the operation of the P/S mechanism 16.

In the described embodiment of the invention, the steering torque is constant irrespective of the car speed. However, the flow regulating valve 140 may be modified to be a solenoid-operated type so that the steering torque produced by the P/S mechanism 16 is variable dependent upon the car speed.

Figure 9:
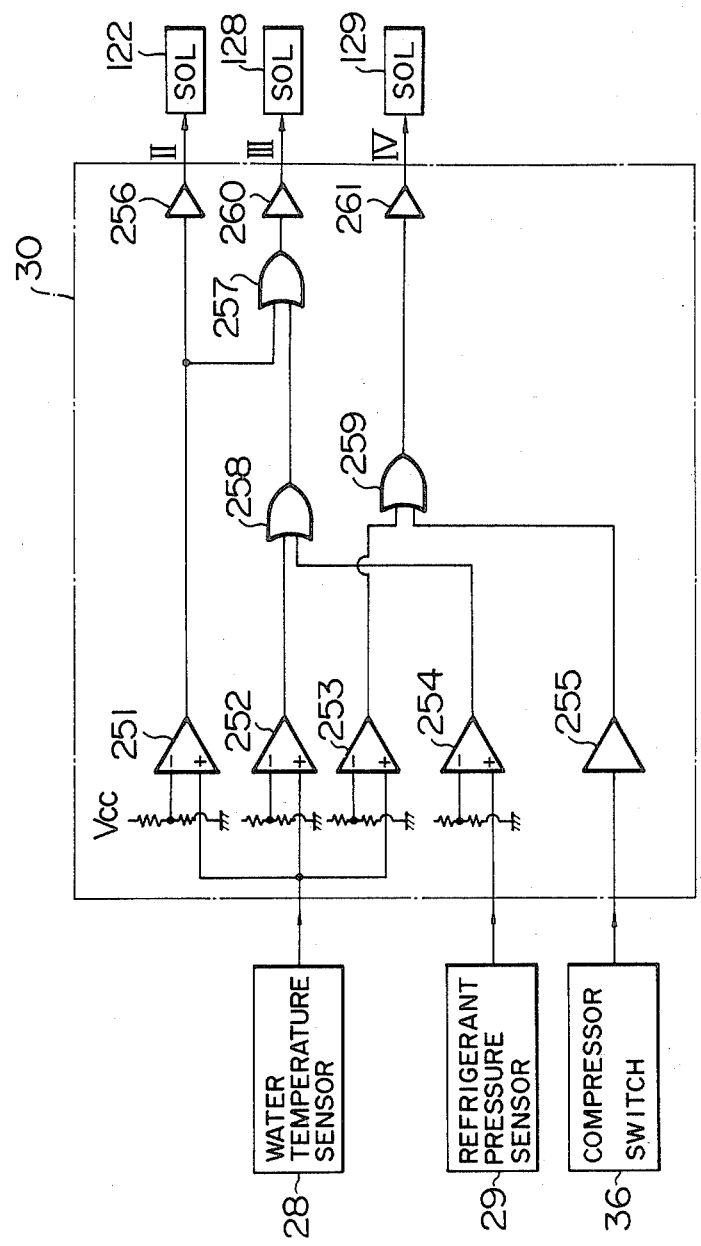
FIG. 9 is an electrical circuit diagram of an electrical control unit shown in FIG. 3.

Cooling demand judgement circuits of the ECU 30 will be described with feference to FIG. 9.

The output of the water temperature sensor 28 is electrically connected to non-inverting input terminals of comparators 251, 252 and 253 having their inverting input terminals electrically connected through predetermined resistors to a reference voltage source Vcc. The arrangement is such that the outputs of the comparators 251, 252 and 253 become "1" levels when the temperature sensed by the water temperature sensor 28 becomes higher than 100° C., higher than 90° C. and higher than 80° C., respectively. The output of the airconditioning refrigerant pressure sensor 29 is electrically connected to a non-inverting input terminal of a fourth comparator 254, the output of which becomes "1" level when the pressure sensed by the pressure sensor 29 becomes 1.5 Mpa. The compressor switch 36 is connected to an amplifier 255, the output of which becomes "1" level when the compressor switch 36 becomes "ON" state.

The output terminal of the comparator 251 is connected to an amplifier 256 as well as to an OR circuit 257. The output terminals of the comparators 252 and 254 are both connected to an input terminal of an OR circuit 258 having its output terminal connected to the input terminal of the OR circuit 257 which in turn has an out put terminal connected to an amplifier 260. The comparator 253 and the amplifier 255 have their output terminal connected to input terminal of an OR circuit 259 having an output terminal connected to an amplifier 261. The amplifiers 256, 260 and 261 have output terminals connected respectively to the aforementioned solenoids 122, 128 and 129. Thus, the ECU 30 is operative to judge the radiation loads or cooling demands in the manner shown in the Table 1 above and control or electrically energize and deenergize the solenoids 122, 128 and 129.

Figure 10:
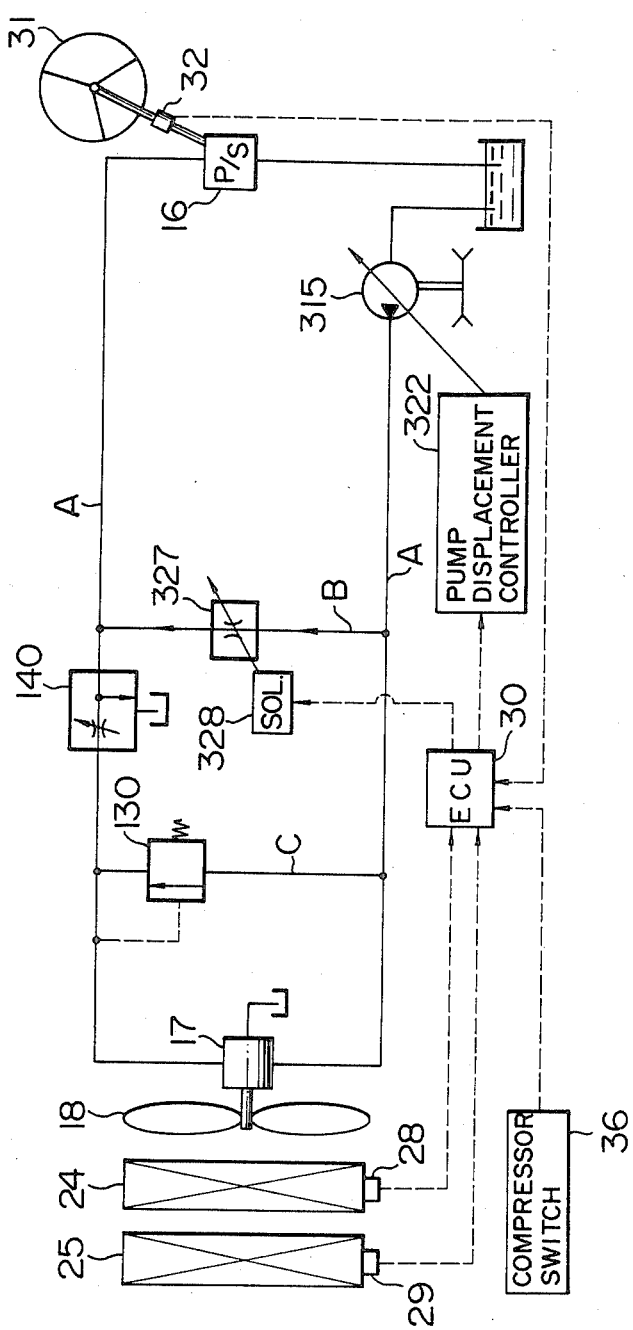
FIG. 10 illustrates a third embodiment of the invention.

A third embodiment of the invention is shown in FIG. 10 in which the same parts as in the second embodiment shown in FIG. 3 are designated by the same reference numerals. The difference will be described hereunder.

The pump 15 and the flow regulating valve 126 of the second embodiment are replaced by a variable volume oil pump 315 designed to be controlled by a pump displacement controller 322 which in turn is controlled by the ECU 30. The solenoid-operated flow control valve 127 of the second embodiment is replaced by a variable orifice 327 designed to be controlled by a solenoid 328 which is controlled by the ECU 30. The second bypass line C with the flow controlling valve 130 therein is moved to a point upstream of the flow regulating valve 140. Thus, the second bypass line C is positioned upstream of the first bypass line B.

The displacement of the pump 315 is continuously controlled by the pump displacement controller 322 in accordance with the cooling demands judged by the ECU 30 on the basis of signals from the water temperature sensor 28, the refrigerant pressure sensor 29 and compressor switch 36. The variable restriction valve 327 is continuously controlled by the solenoid 328 to continuously vary the flow of the hydraulic fluid through the bypass line B.

In this embodiment, the speed of the hydraulic motor 17 and thus the cooling fan 18 is controlled by varying the discharge of the variable displacement oil pump 315, as required, and continuously varying, by the variable restriction valve 327, the flow of the fluid through the first bypass line B. This embodiment provides an advantage that the variable displacement oil pump 315 is required to discharge just the required quantity of fluid, rather than pump any surplus fluid. This feature greatly reduces the power required to drive the pump 315 and thus increases the energy efficiency of the system. In addition, the speed of the hydraulic motor 17 can be continuously controlled and varied. Moreover, when the fluid flows through the second bypass line C, i.e., when the P/S mechanism 16 is in operation, the fluid flow is restricted by the variable restriction valve 140, so that the P/S mechanism 16 is not supplied with any surplus quantity of fluid with resultant good steering feeling given to the operator.

In the described embodiments of he invention, first and second bypass lines B and C are provided to allow the hydraulic fluid to bypass the hydraulic motor 17. However, this is not essential for the invention and one of the two bypass lines may be omitted provided that the remaining bypass line is provided thereon with a flow controlling valve means operative to control the fluid flow through the bypass line in accordance with requirement by the P/S mechanism 16 and the cooling demands of the radiator 24 and the condenser 25.

Figure 11:
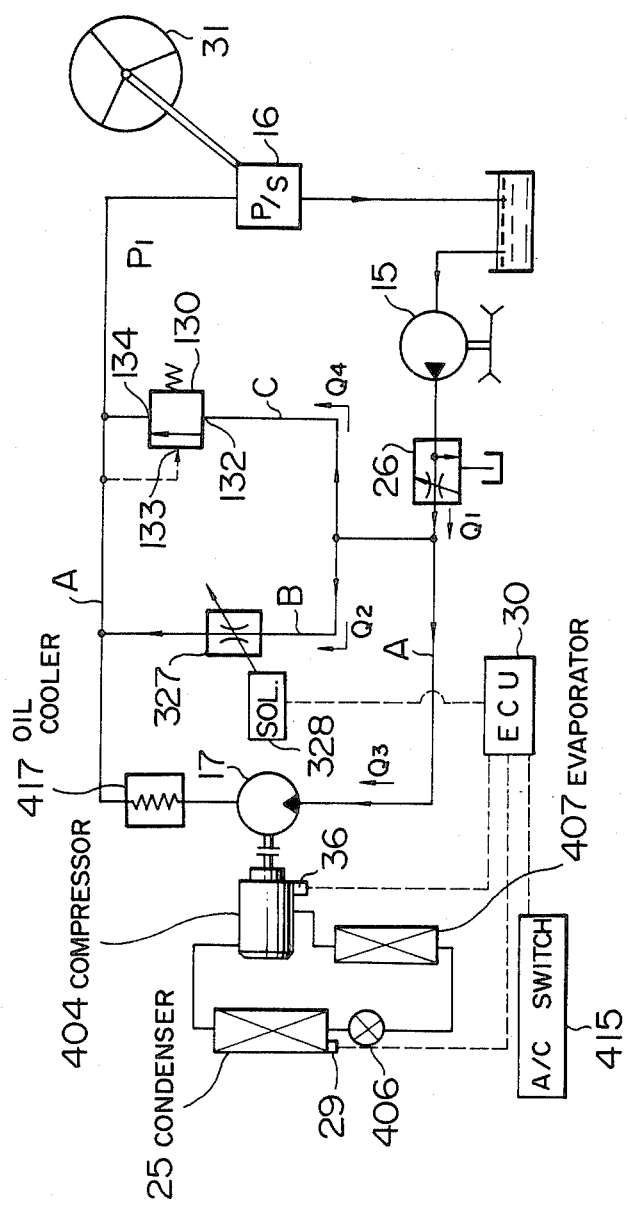
FIG. 11 illustrates a fourth embodiment of the invention.

A fourth embodiment of the invention is shown in FIG. 11 wherein the parts the same as those of the preceding embodiments are designated by the same reference numerals. Thus, it will be sufficient to describe the difference of the fourth embodiment from the preceding embodiments.

The hydraulic motor 17 is designed to drive a refrigerant compressor 404 rather than a cooling fan. The compressor 404 is driven to circulate airconditioning refrigerant through a condenser 25, an expansion valve 406, an evaporator 407 and other elements of the airconditioner, not shown.

The hydraulic circuit is similar partly to that of the embodiment shown in FIG. 3 and partly to that of the embodiment shown in FIG. 10. The hydraulic line A is provided with an oil cooler 417 disposed downstream of the motor 17. The flow regulating valve 140 employed in the second and third embodiments is not provided in the fourth embodiment shown in FIG. 11.

Figure 12:
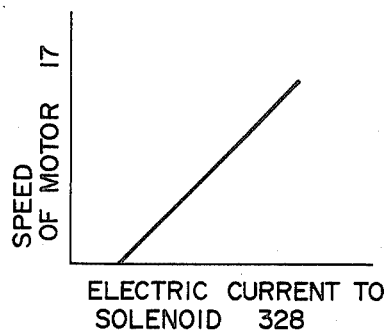
FIG. 12 graphically illustrates the speed of a hydraulic motor shown in FIG. 11 relative to electrical supply to a valve operating solenoid.
Figure 13:
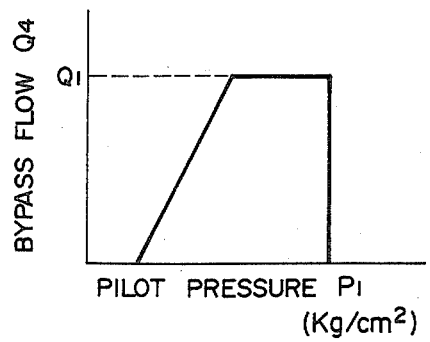
FIG. 13 graphically illustrates bypass flow rate Q4 relative to a pilot pressure P1.

The solenoid 328 controls the variable restriction valve 327 such that the increase in the electrical supply from the ECU 30 to the solenoid 328 continuously decreases the rate of flow Q2 through the first bypass line B so that the rate of flow Q3 to and through the motor 17 is correspondingly controlled to continuously increase the speed of the motor 17, as graphically shown in FIG. 12. The flow control valve 130 provided in the second bypass line C has been described in detail with reference to FIGS. 3, 5 and 7.

The ECU 30 is electrically connected to the compressor switch 36, the refrigerant pressure sensor 29 and an air conditioner switch 415 which emits to the ECU 30 an electrical signal representative of whether or not the air conditioner is in operation. On the basis of signals from the switches 36 and 415 and from the sensor 29, the ECU 30 judges the loads on the compressor 404 and controls the electrical supply to the solenoid 328 accordingly.

The operation is as follows:

When the steering wheel 31 is not manually actuated, i.e., there is no steering action, but if the A/C switch 415 is turned on, the ECU 30 responds to a signal from the A/C switch 415 to electrically energize the solenoid 328 so that the variable restriction valve 327 reduces the rate of flow Q2 through the first bypass line B, whereby the rate of flow Q3 to and through the motor 17 is increased to drive the motor 17 and thus the compressor 404. If the cooling loads on the refrigeration cycle is increased, the pressure sensed by the refrigerant pressure sensor 29 is increased. The increase in the cooling load is detected by the ECU 30 either in the form of a signal from the compressor switch 36 or a signal from the pressure sensor 29, so that the ECU 30 controls the electrical supply to the solenoid 328 to continuously vary the rate of flow Q3 to the motor 17.

In such situation, if the steering wheel 31 is manually actuated, the pressure P1 upstream of the P/S mechanism 16 is suddenly increased. Assuming that the flow control valve 130 were not provided in the second bypass line C, if the total of the pressure differential across the motor 17 and the pressure P1 upstream of the p/S mechanism 16 amounts to a preset pressure level of the flow regulating valve 26 (975 kg/cm$^2$, for example), the flow regulating valve 26 drains the fluid from the pump 15 with a resultant sudden decrease in the pressure applied to the P/S mechanism. This is disadvantageous in that the manual force applied to the steering wheel 31 by the operator is suddenly increased to give a non-smooth steering feeling to the operator.

The flow controlling valve 130 is provided in the second bypass line C to avoid such a disadvantage. For this purpose, the valve 130 operates such that, when the steering wheel 31 is manually rotated and the pilot pressure P1 upstream of the P/S mechanism 16 raises to a predetermined pressure level (5 kg/cm$^2$, for example), the valve 130 commences its opening operation to increase the rate of flow Q4 through the second bypass line C. When the pilot pressure P1 is further raised to 15 kg/cm$^2$, for example, the valve 130 becomes fully opened. At this moment, the flow rate Q4 is equal to the rate of flow Q1 determined by the flow regulating valve 26. In other words, the fluid discharged by the pump 15 is fed to the P/S mechanism 16 in preference to the motor 17 so that the rate of flow Q3 to the motor 17 becomes substantially zero (0) to stop the rotation of the motor and the power cylinder of the P/S mechanism 16 produces a steering power.

In general, one steering action takes a period of from several seconds to 10 seconds and so on. In addition, the heat capacity of the refrigerant in a refrigeration cycle of an automotive airconditioner is so large that, if the compressor 404 is stopped for several minutes, the temperature in the evaporator 407 does not rise suddenly. Thus, even if the motor 17 and the P/S mechanism 16 both require driving hydraulic pressure, only the P/S mechanism 16 is supplied with the hydraulic pressure and the hydraulic pressure supply to the motor 17 is momentarily stopped without any problem. As such, the single pump 15 can be effectively used to drive the compressor driving hydraulic motor 17 and the P/S mechanism 16 as well.

Figure 14:
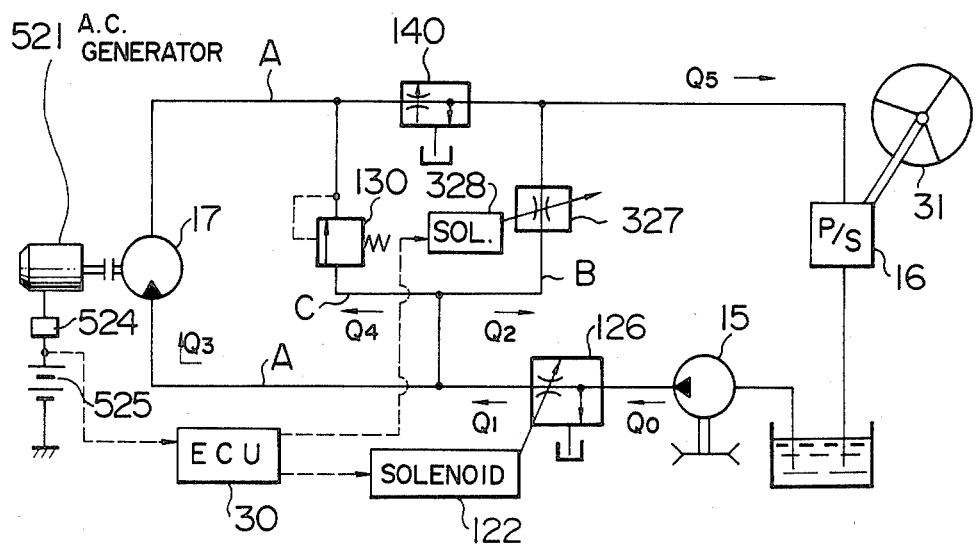
FIG. 14 illustrates a fifth embodiment of the invention.

In a fifth embodiment shown in FIG. 14, an oil pump 15 and a flow regulating valve 126 controlled by a solenoid 122 are provided as in the second embodiment shown in FIG. 3. First and second bypass lines B and C with variable restriction valve 327 and a flow controlling valve 130 and a flow regulating valve 140 are arranged as in the third embodiment shown in FIG. 10. Numerals the same as in the preceding embodiments are used to designate the same elements for the simplification of the description. Numeral 521 designates an A.C. generator or so-called "alternator" driven by the hydraulic motor 17 to generate A.C. current which flows through a regulator 524 to a battery 525. The ECU 30 is electrically connected to the electrical circuit between the regulator 524 an the battery 525.

Figure 15A:
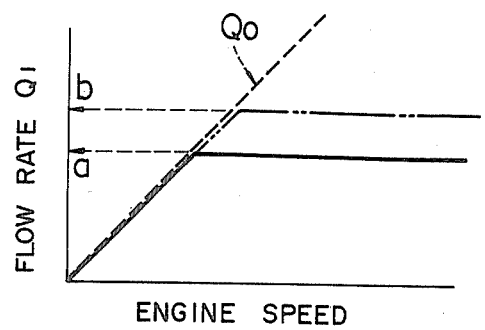
FIG. 15A graphically illustrates a flow rate Q1 in FIG. 14 relative to engine speed.

The flow regulating valve 126 includes a variable orifice the opening of which is varied in two steps so that the rate of flow Q1 just downstream of the valve 126 is controlled to be at two levels a and b, as shown in FIG. 15A. Thus, the flow rate Q1 is controlled in accordance with either the battery voltage or the output of the alternator 521 such that, when either of the battery voltage and the alternator output is low, the flow rate Q1 is the higher level b and, when the voltage is high or the alternator is in normal operation, the flow rate Q1 is the lower level a. The ECU 30 detects the voltage at the battery 525 to control electrical supplies to the solenoids 122 and 328.

In operation, when the battery voltage is lowered the ECU 30 operates to electrically energize the solenoid 122 so that the variable restriction of the valve 126 is widened to increase the flow rate Q1. At the same time, the ECU 30 controls the electrical supply to the solenoid 328 such that the flow control valve 327 is fully closed. As a result, the rate of flow Q3 to and through the motor 17 is increased to the higher level b to thereby increase the speed of the motor 17 and thus of the alternator 521 with a resultant increase in the output thereof.

Figure 15B:
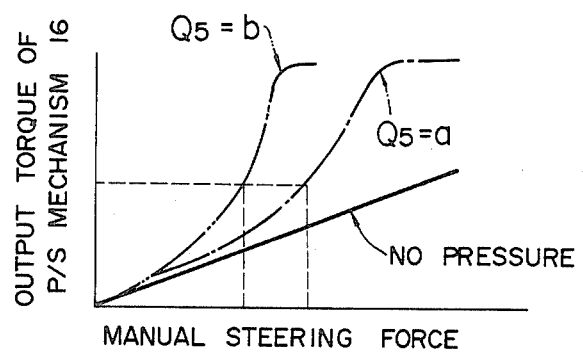
FIG. 15B graphically illustrates the output torque of the power steering mechanism shown in FIG. 14 relative to manual steering force.

If the P/S mechanism 16 is hydraulically operated with the flow rate Q3 being at the higher level b, the manual steering force required to operate the steering wheel 31 would become so smaller than that obtained when the P/S mechanism 16 is operated under the pressure level a that the operator's steering feeling obtained from the steering wheel 31 is too light (see FIG. 15B) to assure a stable steering when at a high vehicle speed. In the embodiment of the invention shown in FIG. 14, however, the flow regulating valve 140 disposed in the line A downstream of the motor 17 is operative to drain any excessive amount of fluid to assure that the rate of flow Q5 to the P/S mechanism 16 is of a proper level. As such, the hydraulic supply to the P/S mechanism 16 is controlled to assure a proper output torque of the P/S mechanism 16 irrespective of the necessity for driving the motor 17 and thus the alternator 521.

If the P/S mechanism 16 is hydraulically operated during a time when the motor 17 is rotated to drive the alternator 521, the hydraulic pressure in the line A upstream of the valve 140 rises, so that the flow controlling valve 130 is opened and thus the motor 17 is momentarily stopped to assure a preferential hydraulic supply to the P/S mechanism 16. The momentary stoppage of the motor 17 causes the alternator to be also momentarily stopped. This, however, does not cause any problem because the battery 525 is of a relatively large capacity.

The flow regulating valve 140 is of conventional constant pressure differential type. With this type of flow regulating valve, the pressure differential across the valve is of a range from 1 to 3 kg/cm$^2$ which is much smaller than the discharge of 50–120 kg/cm$^2$ of the oil pump 15. Thus, the pressure upstream of the flow regulating valve 140 can be utilized to control the operation of the flow control valve 130 in the second bypass line C in accordance with the operating condition of the power steering system.

Figure 16:
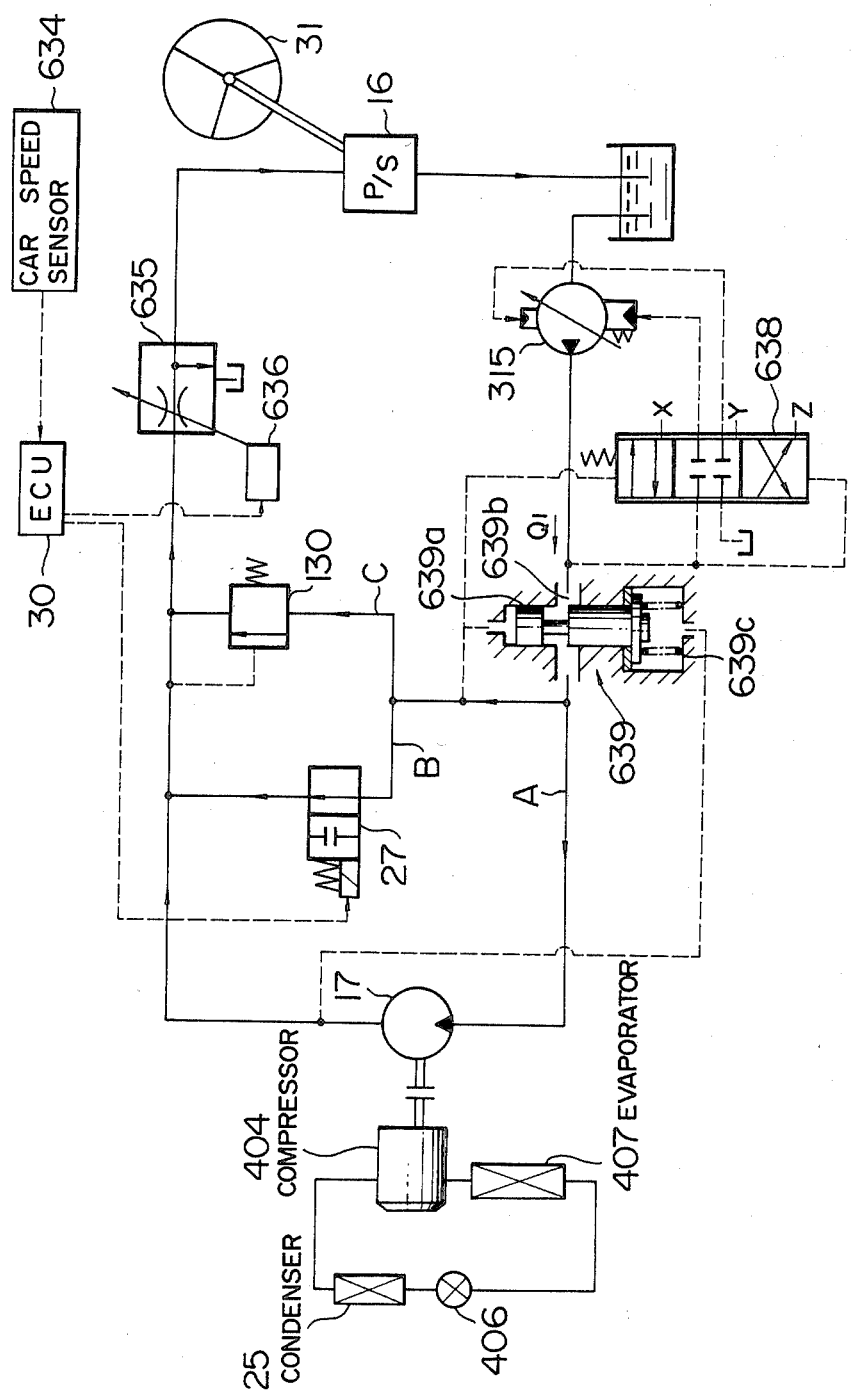
FIG. 16 illustrates a sixth embodiment of the invention.

A sixth embodiment of the invention is shown in FIG. 16 in which the parts the same as those of the preceding embodiments are designated by the same reference numerals. The pump 315 is of a variable displacement type, as in the third embodiment shown in FIG. 10, and may preferably be of vane type or radial piston type. The displacement of the pump 315 is controlled by a 4-way valve 638 such that the pump discharge is increased when the valve 638 is in its X position shown, the pump discharge is decreased when the valve 638 is in its Z position shown and the pump discharge is at a predetermined constant level when the valve 638 is in its Y position shown. The operation of the valve 638 is controlled by a pressure difference across a differential pressure responsive valve 639 disposed in the hydraulic line A downstream of the pump 315. The differential pressure responsive valve 639 is operative in response to a pressure difference across the hydraulic motor 17 to control the rate Q1 of the hydraulic fluid flow from the pump 315.

The motor 17 is drivingly connected to a refrigerant compressor 404 as in the fourth embodiment shown in FIG. 11. The compressor is disposed in a refrigeration cycle including a condenser 25, an expansion valve 406 and an evaporator 407.

When the load on the compressor 404 is increased, the speed of the motor 17 is lowered with a resultant increase in the pressure difference across the motor 17. As a result, a spool 639a of the valve 639 is moved against a spring 639c to increase the opening of a variable restriction port 639b to thereby increase the flow rate Q1. In consequence, the pressure difference across the valve 639 is decreased to cause the 4-way valve 638 to be shifted from the Y position to the X position in which the discharge of the pump 315 is at a high level. In this state, if the flow rate Q1 is increased with a resultant increase in the pressure difference across the differential pressure responsive valve 639, the 4-way valve 638 is shifted from the X position to the Y position in which the pump discharge is the predetermined constant level which is dependent on the pressure difference across the motor 17.

On the other hand, if the load on the motor 17 is decreased with a resultant decrease in the pressure difference across the motor 17, the opening of the variable restriction port 639b of the valve 639 is decreased with a resultant decrease in the flow rate Q1. In consequence, the pressure difference across the valve 639 is increased to shift the 4-way valve 638 from the Y position to the Z position in which the discharge of the pump 315 is at the decreased level. In this state, if the flow rate Q1 is lowered to decrease the pressure difference across the differential pressure valve 639, the 4-way valve 638 is shifted from the Z-position to the Y-position to make the flow rate Q1 stable. As such, the discharge of the pump 315 is automatically controlled by the combination of the differential pressure responsive valve 639 and 4-way valve 638 which combination is operative in response to the pressure difference across the hydraulic motor 17.

The first and second bypass lines B and C are arranged as in the fourth embodiment shown in FIG. 11. The first bypass line B is provided therein with a solenoid-operated flow control valve 27 similar to the valve 27 which is employed in the first embodiment of the invention shown in FIG. 1 and is controlled by the ECU 30 which, in this case, however, is responsive to signals from a car speed sensor 634. The second bypass line C is provided with a flow control valve 130 employed in the embodiments shown in FIGS. 3, 10, 11 and 14.

A variable restriction flow control valve 635 is disposed in the line A upstream of the P/S mechanism 16 and downstream of the second bypass line C. The valve 635 is controlled by a solenoid 636 which in turn is controlled by the ECU 30. Accordingly, the variable restriction flow control valve 635 is controlled in accordance with the car speed (sensed by the car speed sensor 634) to control the rate of hydraulic fluid flow to the P/S mechanism 16 such that the steering power produced by the P/S mechanism 16 is varied in dependence on the car speed to assure a stable car operation.

Figure 17:
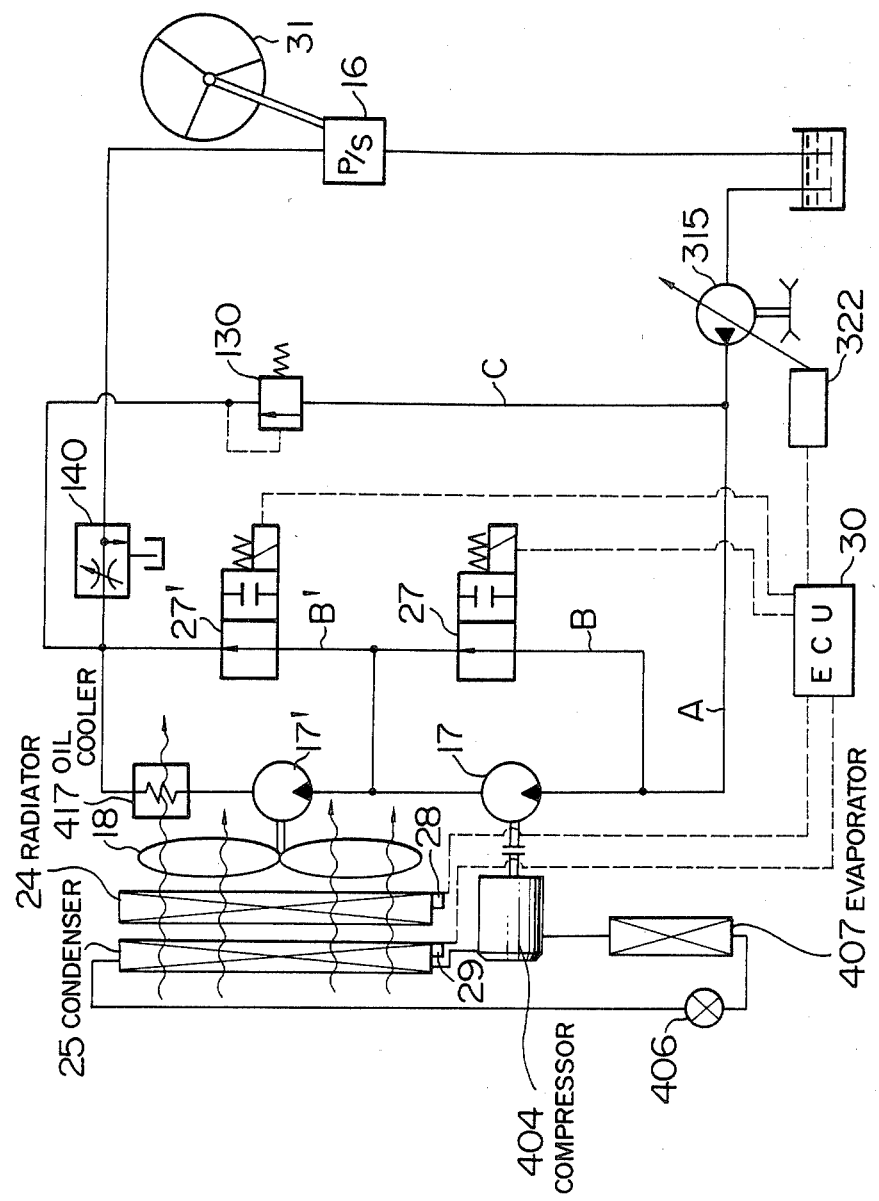
FIG. 17 illustrates a seventh embodiment of the invention.

A seventh embodiment of the invention is shown in FIG. 17 wherein the parts the same as those of the preceding embodiments of the invention are designated by the same reference numerals. In short, the seventh embodiment is characterized by the provision of a pair of hydraulic motors 17 and 17' both disposed in the hydraulic line A in series relationship with each other. However, a first bypass line B is provided in bypassing relationship to the first motor 17. An oil cooler 417 is disposed in the main line A just downstream of the second motor 17'. A second bypass line B' is provided in bypassing relationship to the second motor 17' and the oil cooler 417. Solenoid-operated flow controlling valves 27 and 27' are disposed respectively in the first and second bypass lines B and B'. A third bypass line C is provided in parallel relationship to the first and second bypass lines B and B'. a flow controlling valve 130 is disposed in the third bypass line C. A variable restriction valve 140 is provided in the main line A downstream of the second and third bypass lines but upstream of the P/S mechanism 16. Hydraulic fluid is pumped by a variable displacement pump 315. The discharge of the pump 315 is controlled by a solenoid 322 which in turn is controlled by the ECU 30.

The first motor 17 is drivingly connected to a compressor 404 disposed in a refrigeration cycle including a condenser 25, an expansion valve 406 and an evaporator 407. The second motor 17' drives a fan 18 adapted to cool the condenser 25, an engine radiator 24 and the oil cooler 417. The ECU 30 is electrically connected to a water temperature sensor 28 on the radiator 24 and to a refrigerant pressure sensor 29 on the condenser 25.

The flow control valves 27 and 27' in the first and second bypass lines B and B' are controlled, respectively, by the ECU 30 on the basis of signals emitted by the sensors 28 and 29 to the ECU 30. More specifically, when the signals from the sensors 28 and 29 are both at levels lower than predetermined levels, the valves 27 and 27' take the positions shown in FIG. 17 in which the fluid flow from the pump 315 is allowed to pass through the bypass lines B and B'. When the signals from the sensors 28 and 29 are both at levels higher than predetermined levels, the valves 27 and 27' are both closed to cause the hydraulic fluid to flow to and through the first and second motors 17 and 17'

The operations of the flow control valve 130 and the variable flow restriction valve 140 will be apparent from the description of the valves 130 and 140 of the preceding embodiments.

Figure 18:
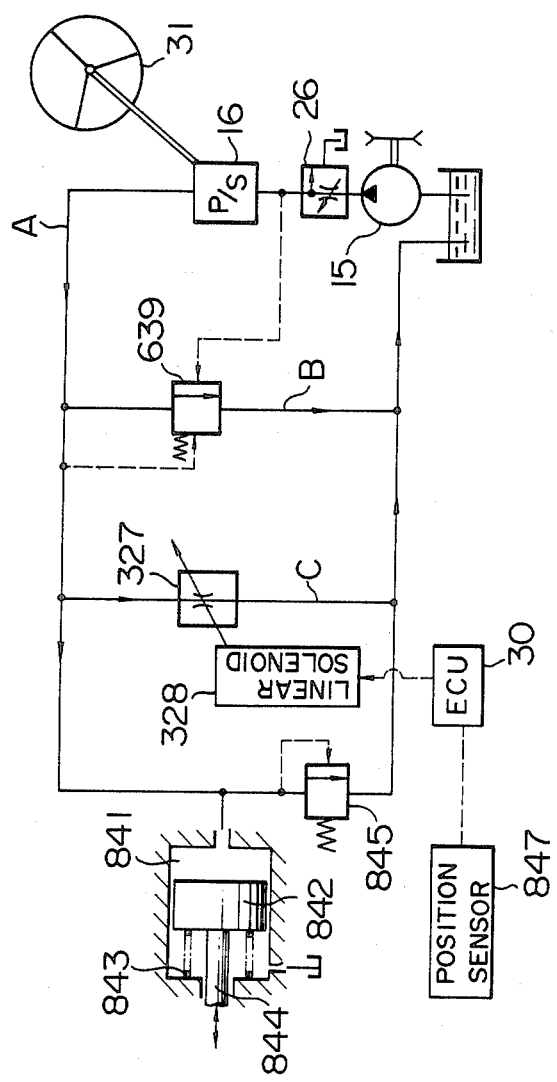
FIG. 18 illustrates an eighth embodiment of the invention.

An eighth embodiment of the invention is shown in FIG. 18 in which the parts the same as those of the preceding embodiments are designated by the sam reference numerals. In this embodiment, the P/S mechanism 16 is hydraulically connected to an oil pump 15 by a hydraulic line A in which a flow regulating valve 26 is provided between the pump 15 and the P/S mechanism 16. A hydraulic cylinder 841 is hydraulically connected to the line A downstream of the P/S mechanism 16. A piston 842 is slidably disposed in the cylinder 841 and adapted to be hydraulically driven against a compression spring 843. The piston 842 is connected to a piston rod 844 which in turn is connected, for example, to wheel suspension mechanism (not shown) of a vehicle to adjust the height of the vehicle. A pressure relief valve 845 is disposed in the line A downstream of the cylinder 841 and is operative to relieve the hydraulic pressure in the line A when the pressure therein rises to a predetermined pressure level.

The first bypass line B is provided thereon with a flow control valve 639 responsive to the pressure difference across the P/S mechanism 16 to control the bypass flow of the fluid through the first bypass line B. The second bypass line C is provided therein with a variable restriction valve 327 having a variable orifice which is controlled by a linear solenoid 328 which in turn is controlled by the ECU 30 which is responsive to electrical signals from a position sensor 847 which is operative to sense either the height of the vehicle or the stroke of the piston rod 844 to emit corresponding signals to the ECU 30.

It is assumed that the sensor 847 senses the vehicle height. When the vehicle height sensed is shorter or lower than a predetermined dimension, the ECU 30 controls the solenoid 328 such that opening of the variable restriction orifice of the valve 327 is decreased to raise the hydraulic pressure in the cylinder 841 so that the piston rod 844 is extended out of the cylinder 841. On the other hand, if the piston rod 844 is extended too much, the ECU 30 controls the solenoid 328 such that the variable orifice in the valve 327 is widened to lower the pressure in the cylinder 841 so that the extension of the piston rod 844 from the cylinder 841 is shortened to decrease the height of the vehicle, i.e., to lower the car body.

Figure 19:
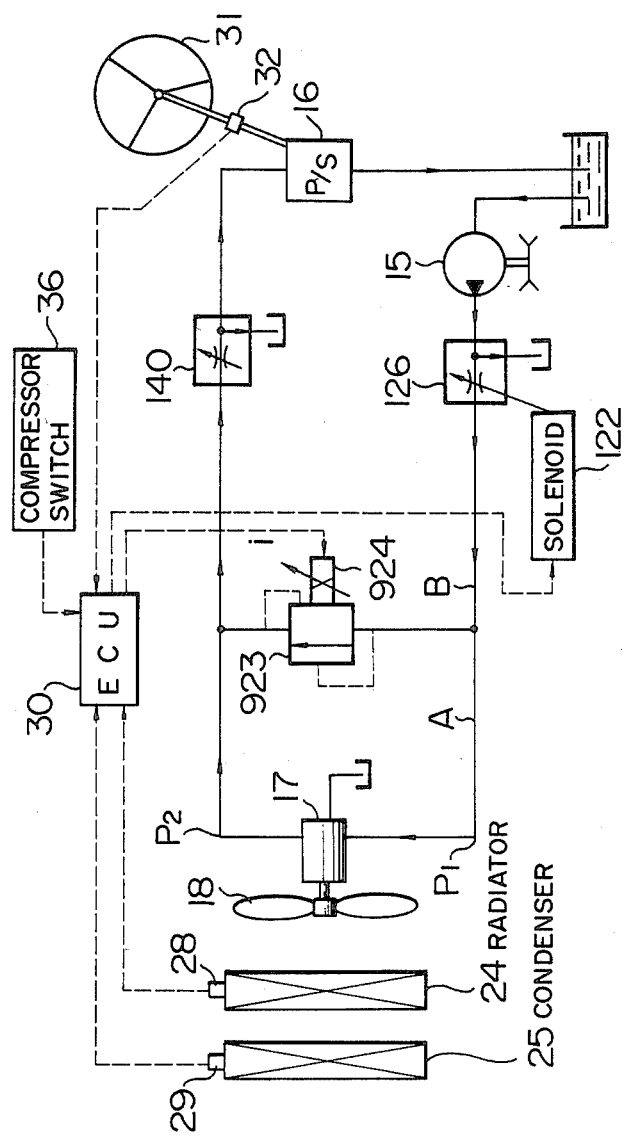
FIG. 19 illustrates a ninth embodiment of the invention.

FIG. 19 shows a ninth embodiment of the invention which is similar to the second embodiment shown in FIG. 3 with the exception that the second bypass line C is omitted for the simplification of the structure, that the flow control valve 127 in the first bypass line B of the second embodiment is replaced by a differential pressure control valve 923 and that the flow regulating valve 140 is moved to a position on the line A just upstream of the P/S mechanism 16.

The differential pressure control valve 923 is controlled by a linear solenoid 924 to control the pressure difference (P1−P2) across the hydraulic motor 17. The control is such that the pressure difference (P1−P2) is in proportion to the electrical supply from the ECU 30 to the solenoid 924. When the valve 923 is controlled to establish a small pressure difference (P1−P2), the speed of the motor 17 and thus of the cooling fan 18 is low and, vice versa.

The flow regulating valve 140 is operative to drain any excess fluid flow to the P/S mechanism 16 as in the second embodiment of the invention. The ECU 30 is electrically connected to the steering sensor 32 so that the differential pressure control valve 923 is controlled by the ECU 30 such that, when a steering action is sensed by the steering sensor 32, the pressure difference set by the valve 923 is maximum to assure the hydraulic supply to the P/S mechanism 16 in preference to the pressure supply to the motor 17. On the other hand, when there is no steering action sensed by the sensor 32, the valve 923 is controlled by the ECU 30 such that the pressure difference set by the valve 923 is continuously varied to control the speed of the motor 17 in accordance with the cooling demands.

The valve 923 may be replaced by a solenoid operated variable restriction valve which is similar to the valve 327 shown in FIG. 10 and which is controlled in accordance with a signal from a differential pressure sensor (not shown) disposed to detect the pressure difference (P1−P2) across the motor 17 so that the pressure difference can be controlled by such a variable restriction valve.

What is claimed is:

1. a hydraulic drive system for a vehicle having an engine including:
    a hydraulic pump drivingly connected to the engine to pump hydraulic fluid through a hydraulic fluid supply line;
    a power steering mechanism disposed in said main hydraulic fluid supply line and operable by the hydraulic fluid from said hydraulic pump in response to a steering operation of a steering system of the vehicle;
    a hydraulic actuator disposed in said main hydraulic fluid supply line in series with said power steering mechanism so that the actuator is hydraulically driven by the hydraulic fluid from said pump to drive an accessory of the vehicle;
    a bypass line extending in bypassing relationship with said hydraulic actuator to interconnect points of said main hydraulic supply line upstream and downstream of said actuator;
    a bypass valve disposed in said bypass line to control the flow of the hydraulic fluid through said bypass line such that the flow through said bypass line is increased substantially in proportion to the increase in a steering force applied to the steering system;
    said bypass valve including a spool having a tapered part operable by a pilot pressure formed by the hydraulic pressure in said main hydraulic fluid supply line upstream of said power steering mechanism to continuously vary hte fluid flow through said bypass valve and thus through said bypass line;
    a restriction orifice means through which said pilot pressure is applied to said spool; and
    a check valve disposed in parallel relationship with said restriction orifice means constructed and arranged to be opened only when said spool is moved in a direction to increase the fluid flow through said bypass valve and thus through said bypass line.

2. A hydraulic drive system according to claim 1, wherein said bypass valve is arranged such that, when the steering force applied to said steering system is decreased, the flow of the hydraulic fluid through said bypass line is gradually decreased.

3. A hydraulic drive system according to claim 1, further including:
    a steering sensor means for detecting the steering force applied to the steering system; and
    controlling means responsive to a signal from said steering sensor means to detect the steering force to emit to said bypass valve an instruction signal whereby said bypass valve permits the flow of the hydraulic fluid therethrough at a rate according to the steering force thus detected.

4. A hydraulic drive system according to claim 3, wherein said bypass valve comprises an on-off valve and said controlling means are operative to determine the ratio of a time period while said on-off valve is open relative to a time period while said on-off valve is closed.

5. A hydraulic drive system according to claim 3, further including a condition detecting sensor operative to detect the condition of said vehicle accessory, and wherein said control means are normally responsive to a signal from said condition detecting sensor to control said bypass valve so that said hydraulic actuator is supplied with the hydraulic fluid at a rate at which said accessory can be driven in a desired manner, but when said control means receive a signal from said steering sensor means, said control means are operative only in response to said steering sensor signal to control said bypass valve so that the hydraulic fluid can flow through said bypass line at a rate according to the steering force applied to the steering system.

6. A hydraulic drive system according to claim 1, further including a flow regulating valve disposed in said main hydraulic supply line between said hydraulic actuator and said power steering mechanism.

7. A hydraulic drive system according to claim 9, further including a speed sensor operative to detect the speed of the vehicle and means for controlling said flow regulating valve in accordance with a signal from said speed sensor.

8. hydraulic drive system according to claim 1, an additional bypass line disposed in parallel relationship with first-said bypass line;

an additional bypass valve disposed in said additional bypass line to control the flow of the hydraulic fluid therethrough;

a condition sensor operative to detect the condition of said accessory; and means responsive to a signal from said condition sensor to control said additional bypass valve.

9. A hydraulic drive system according to claim 1, wherein said accessory is a refrigerant compressor of an automotive air-conditioner.

10. A hydraulic drive system according to claim 1, wherein said accessory is an A.C. generator on the vehicle.

11. A hydraulic drive system according to claim 1, wherein said accessory is a cooling fan.

12. A hydraulic drive system according to claim 1, wherein said accessory is a hydraulic cylinder unit for varying the height of the vehicle.

13. A hydraulic drive system according to claim 1, wherein said hydraulic pump is a variable displacement pump.

* * * * *